Nov. 13, 1934.  E. T. REARDON  1,980,698

ROTOR FOR DYNAMO ELECTRIC MACHINES

Filed June 25, 1932

Inventor
Earl T. Reardon
By E. E. Huffman
Att'y.

Patented Nov. 13, 1934

1,980,698

UNITED STATES PATENT OFFICE 1,980,698

ROTOR FOR DYNAMO-ELECTRIC MACHINES

Earl Thomas Reardon, St. Louis, Mo., assignor to Wagner Electric Corporation, St. Louis, Mo., a corporation of Delaware Application June 25, 1932, Serial No. 619,259

9 Claims. (Cl. 171—206)

My invention relates to the balancing of rotors for dynamo electric machines and more particularly to rotors which are provided with slots for the reception of windings. In this type of rotor the conductors which extend beyond the ends of the slots do not permit the use of a balancing ring, especially at the front or commutator end of the rotor. Heretofore, as known to me, balancing weights have been attached to rotors of this type by means of solder, but this means of attachment has been found to be unsafe and not permanent as the rotor may become sufficiently heated to melt the solder and release the weights.

One of the objects of my invention is to so construct a rotor of the type referred to, that the balancing weights may be readily applied at the end thereof without the use of special tools and at a low cost.

A more specific object of my invention is to so construct the laminæ of a laminated rotor that peripherally spaced recesses will be formed in the end of the assembled rotor between adjacent conductor slots for the reception of the necessary balancing weights, the weights being permanently secured therein by bending thereover a portion of a tooth of one of the adjacent laminæ.

Figure 1:
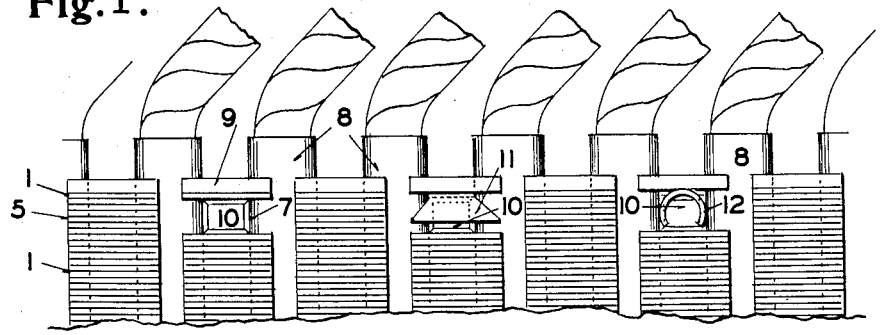
Figure 2:
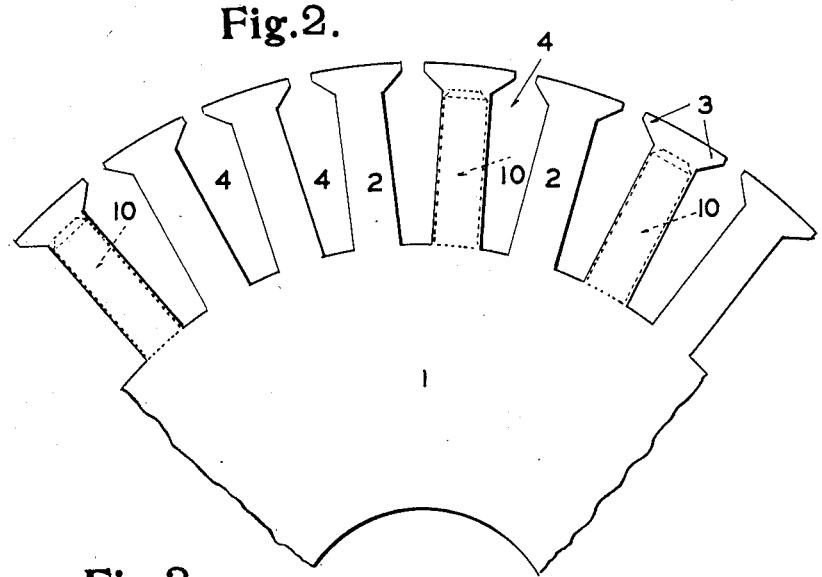
Figure 3:
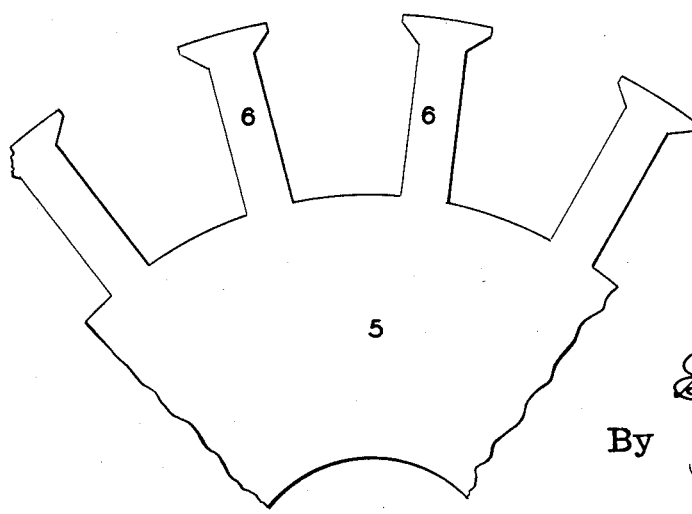

Other objects will become apparent from the following description of a single embodiment of my invention taken in connection with the accompanying drawing, in which Figure 1 is a developed view of a portion of the end of a dynamo electric machine rotor showing my invention embodied therein; and Figures 2 and 3 are views of portions of the two forms of laminæ from which the rotor is constructed.

Referring to the drawing, 1 indicates a standard rotor lamina provided with circumferentially spaced apart teeth 2 having lips 3 to partially close the slots 4. The lamina 5 is identical to the lamina 1 except that every other tooth is eliminated, leaving only the teeth 6, also provided with lips as shown.

In assembling the laminæ to form the rotor, the correct number of laminæ 1 are first stacked on the rotor shaft and then a number of laminæ 5 are stacked thereon, the teeth 6 coinciding with every other tooth of the laminæ 1. A single lamina 1 is now placed on top of the laminæ 5, as clearly shown in Figure 1. This arrangement of the laminæ results in the formation of recesses or pockets 7 between the teeth 6 of the laminæ 5, the walls of these pockets being formed by the teeth 2 of the single outer lamina 1, the outer end of the series of laminæ 1, and the conductor cells 8 which are shown in Figure 1 as positioned in the slots of the rotor. In order to prevent the single outer lamina 1 from flaring, a rigid end punching 9 is placed on the end of the rotor, the shape of which is identical with the laminæ 1. The recesses 7 form spaces for the reception of such metal weights or slugs 10 as may be necessary to mechanically "balance" the rotor, these weights being of non-magnetic material as, for example, lead or copper. Three of such weights, indicated by dotted lines in Figure 2 and each recess illustrated in Figure 1, is shown as containing a weight. The weights may be held in the recesses 7 by the bending over of the outer end of one of the adjacent teeth 2, as at 11, or by bending the lips 3 of the teeth inwardly in the manner shown at 12.

By the use of my invention for attaching the metal balancing weights to a rotor, there is no danger of the weights becoming free of the rotor by over-heating as the bent over lips maintain them in their recesses or pockets under all conditions.

My invention also eliminates the necessity of placing the balancing weights on the outside of the outlines of the rotor where they may be accidently knocked off and their application involves no disturbance of the conductors. The elimination of the small amount of active rotor material to form the recesses 7, will in no way materially affect the operation of the machine. In cases where the amount of magnetic material in the rotor is not particularly important, all teeth may be omitted from the laminæ 5.

Having fully described my invention, what I claim as new and desire to secure by Letters Patent of the United States is:

1. A laminated rotor for a dynamo electric machine provided with a plurality of circumferentially distributed recesses in the peripheral surface of the laminæ, balancing weights in a selected number of said recesses, and means comprising portions of the laminæ for retaining the weights in their recesses.

2. A laminated rotor for a dynamo electric machine provided with a plurality of circumferentially distributed recesses in the peripheral surface of the laminæ for the reception of balancing weights, and balancing weights in a selected number of recesses, portions of the laminæ being distorted to retain the weights therein.

3. In a dynamo electric machine, a slotted rotor comprising a plurality of toothed laminæ forming conductor receiving slots, groups of conductors in said slots, a group of adjacent laminæ having fewer teeth than the laminæ forming the main body of the rotor whereby a plurality of peripheral recesses are produced between conductor groups, and balancing weights in a selected number of recesses.

4. A laminated dynamo electric machine rotor provided with a plurality of circumferentially distributed recesses in its periphery, balancing weights in a selected number of said recesses, means for retaining said weights in said recesses, said means comprising portions of the laminæ distorted to overlie the weights.

5. In a dynamo electric machine, a slotted rotor comprising a plurality of toothed laminæ forming conductor receiving slots, groups of conductors in said slots, a group of adjacent laminæ having fewer teeth than the laminæ forming the main body of the rotor, an end member provided with the same number of teeth as said first named laminæ, said laminæ and conductor groups forming a plurality of recesses in the rotor, and balancing weights in a selected number of the recesses.

6. In a dynamo electric machine, a slotted rotor comprising a plurality of toothed laminæ forming conductor receiving slots, groups of conductors in said slots, a group of adjacent laminæ having fewer teeth than the laminæ forming the main body of the rotor, whereby a plurality of peripheral recesses are produced in the rotor, balancing weights in a selected number of the recesses, and means for retaining said balancing weights in their recesses.

7. A laminated rotor for a dynamo electric machine provided with a plurality of circumferentially distributed recesses in the peripheral surface of the laminæ, balancing weights in a selected number of said recesses, and means comprising portions of the laminæ for retaining the weights in their recesses, said balancing weights being retained in said recesses by the distortion of portions of said laminæ.

8. In a dynamo electric machine, a rotor, means forming a plurality of circumferentially distributed recesses adjacent the end of the rotor, balancing weights in a selected number of said recesses, and individual means for retaining each weight in its recess, said means comprising a distorted portion of the means forming the recess.

9. In a dynamo electric machine, a rotor, means forming a plurality of circumferentially distributed recesses in the periphery of the rotor, balancing weights in a selected number of said recesses, and means for retaining the weights in said recesses, said means comprising independently distorted portions of said means forming the recesses.

EARL THOMAS REARDON.